United States Patent [19]

Shelton

[11] Patent Number: 4,942,849
[45] Date of Patent: Jul. 24, 1990

[54] FAIL-SAFE COOLANT THERMOSTAT SYSTEM FOR AN INTERNAL COMBUSTION ENGINE

[76] Inventor: Vernon E. Shelton, 430 Top Hill Dr., Tyler, Tex. 75703

[21] Appl. No.: 334,580

[22] Filed: Apr. 6, 1989

[51] Int. Cl.[5] .............................................. F01P 7/14
[52] U.S. Cl. ............................... 123/41.1; 123/41.15; 251/129.21
[58] Field of Search .............. 251/129.02, 129.16, 251/129.21; 123/41.08, 41.09, 41.1, 41.15, 198 D; 236/34.5, DIG. 2, 34

[56] References Cited

U.S. PATENT DOCUMENTS

| | | | |
|---|---|---|---|
| 2,013,424 | 9/1935 | Rippe | 236/34 |
| 4,399,775 | 8/1983 | Tanaka et al. | 123/41.44 |
| 4,469,275 | 9/1984 | DeSalve | 236/DIG. 2 |
| 4,512,546 | 4/1985 | Inada et al. | 251/129.02 |

Primary Examiner—Noah P. Kamen
Attorney, Agent, or Firm—Lyon & Lyon

[57] ABSTRACT

A system for converting the failure mode of a motor vehicle type thermostat whereby a secondary cooling fluid passage, connected in parallel to the primary (thermostat-controlled) cooling fluid passage, is established. The by-pass valve means of the secondary passage is normally open and is closed only when the motor vehicle ignition is started. If the control for the primary passage malfunctions, a thermocoupler interrupts the circuit that holds said by-pass valve closed, thus allowing cooling fluid to flow through said secondary passage. A means for manually controlling the secondary passage valve is further disclosed.

7 Claims, 1 Drawing Sheet

FAIL-SAFE COOLANT THERMOSTAT SYSTEM FOR AN INTERNAL COMBUSTION ENGINE

Background of the Invention

This invention relates to the control of a cooling system, such as for an internal combustion engine, and in particular to the controlled operation of a thermostatic valve.

The cooling of a motor vehicle internal combustion engine is usually accomplished by a forced circulation system in which a fluid is pumped from an engine block where it picks up heat, through a radiator where the fluid loses heat to the atmosphere, and then back in a cooler state to the engine block. Regulation of the flow of such fluid is typically accomplished by use of a thermostat that includes a normally-closed, heat-activated valve which functions as follows: when the fluid is cold the valve remains closed and prevents flow of the fluid through the radiator, and when the temperature of the fluid increases past a certain predetermined temperature, the valve opens and permits the fluid to flow through the radiator and back to the engine block. Clearly, if the thermostat valve remains closed (because of malfunction or the like), then the fluid therein will not circulate when the engine block temperature increases. Thus, the engine block can overheat which can lead to possible catastrophic damage to the engine.

Coupled with the above is the desirability of rapid warming of the engine block when the motor vehicle is started. As the skilled artisan will readily appreciate, an increased engine temperature is important for the proper operation of the motor vehicle. However, as any motor vehicle operator knows, the engine block will become sufficiently "warm" after a brief period of operation of the vehicle after the engine is started.

Various thermostatic by-pass devices have heretofore been known. One example is contained in U.S. Pat. No. 4,399,775, wherein a vacuum-operated by-pass valve, described as being beneficial for maintaining a mean engine temperature, responds to low engine temperature to close the by-pass valve and to low manifold vacuum for opening the by-pass valve. As described, both vacuum and temperature are utilized to moderate the flow to sustain a higher mean operating temperature. Another example is described in U.S. Pat. No. 4,399,776 wherein a solenoid operated valve, normally in a closed position, is described as being electrically opened upon the failure of the thermostat. In U.S. Pat. No. 3,776,457 a fail-safe by-pass for thermostatic valves is described wherein the valve is normally in the closed position. U.S. Pat. Nos. 3,120,926 and 2,833,478 each describe manually operated thermostatic control mechanisms, whereby said mechanism are also normally in the closed position. Finally, in U.S. Pat. Nos. 2,735,621 and 2,098,712 by-pass thermostats for use in internal combustion engines are described wherein the valves are also normally closed. The disclosures of the above-mentioned patents are incorporated herein by references for a full understanding of the present invention.

Because the by-pass systems described above all operate by maintaining the valve in a closed mode and electrically or manually opening the valve when the engine temperature exceeds a pre-determined limit or upon failure of the engine thermostat, any failure of these by-pass valves leads to the one problem that must be avoided—overheating of the engine. Clearly, as between waiting for a slightly increased period of time while the engine warms to allow for proper operation of the motor vehicle and having the engine overheat, the operational time delay in no way compares to the potential for a malfunctioning engine due to overheating thereof. It is to the problem that the present invention is directed.

Summary Of Invention

The present invention provides a system for bYpassing the heat-controlled valve (thermostat) whenever said valve fails to function as designed. In accordance with the invention disclosed herein, the present system includes a valve that is normally urged to open by a spring and closes only when an electrical circuit is energized. The system is also arranged such that the valve is urged open by spring action whenever either the ignition switch is turned off or when the circuit is interrupted by a thermoswitch. Accordingly, while the at-rest position of the thermostat is closed, the at-rest position of the spring-loaded bypass valve is open. Whenever the system is activated by turning on the ignition switch while the engine coolant is cool, the spring-loaded valve is urged from the at-rest open position to a closed position, the system functioning in a normal manner with the thermostat opening as the engine coolant warms above a pre-determined temperature. In the event that the thermostat does not open (i.e. fails), the fluid temperature will rise to a level that causes the thermoswitch to interrupt the circuit previously activated by closing the ignition switch, thereby allowing the spring in the spring-loaded valve to resume its normal open position. A second means is therefore established to provide circulation of the coolant irrespective of a failure of the primary means.

The accompanying drawing is provided for illustrative purposes and is not to be construed as limiting or constricting the scope of the claims of the present invention in any manner.

Detailed Description of the Preferred Embodiment

Figure 1:
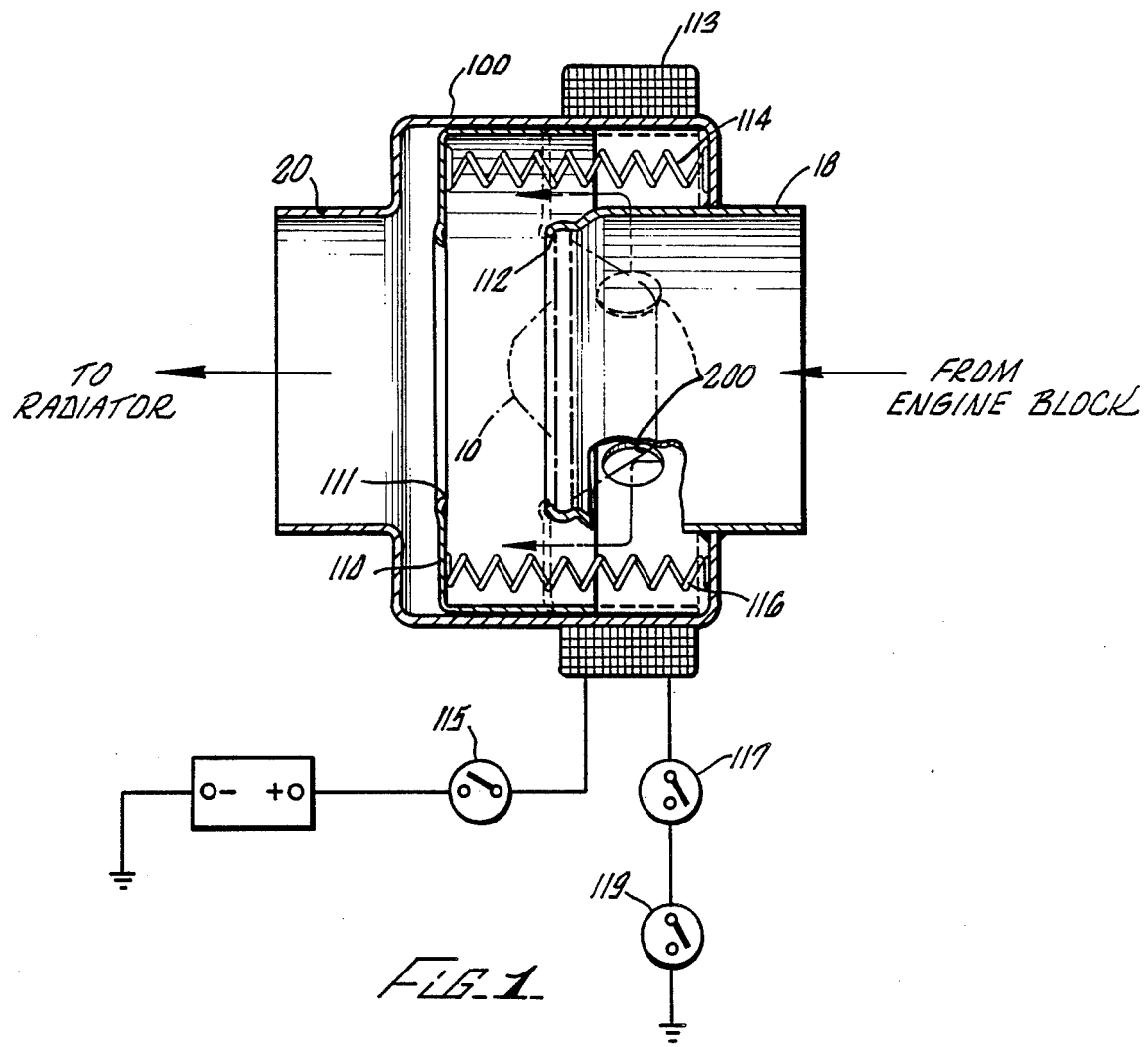
FIG. 1 is a schematic diagram of the presently claimed system with the thermostatic valve assembly show in cross-section.

As depicted in FIG. 1, the cooling fluid communicated from an internal combustion engine block (not shown) to a radiator (not shown) passes through by-pass valve 100 of the present invention and a thermostat 10 shown in phantom (dot and dash) lines. By-pass valve 100 is depicted by solid lines in an open position and by dashed lines in a closed position. The thermostat 10 may be of any conventional type and is self-contained to function to close when the coolant is cold and open as the coolant is heated. As will be readily understood by those skilled in the art, a primary passage for the normal flow of cooling fluid through the device in the direction of the arrow labelled "FROM ENGINE BLOCK" in FIG. 1 is formed by the inlet tube 18, the openings through the thermostat 10, central opening 111 and outlet tube 20 to the arrow labelled "TO RADIATOR." When thermostat 10 is closed, such as at low temperatures, this primary passage is closed.

By-pass valve 100 contains a cup-shaped valve body 110 biased by spring 114 and spring 116 to a normally open direction. Upon energizing of solenoid 113 surrounding the casing of by-pass valve 100, valve body 110 is urged in contact with valve seat 112 for closing the communication from by-pass ports 200 through the central opening 111 in valve body 110.

Solenoid 113 is electrically connected, by any method known to those skilled in the art, in series with the motor vehicle ignition switch 115 (shown open) and a thermoswitch 117 (shown open). A third switch 119 (shown open) may be wired in the same series arrangement with switch 115 and switch 117, and placed in a position accessible to the operator of the motor vehicle to allow manual control of by-pass valve 100.

During normal operation of a motor vehicle in accordance with the present system, when the operator turns the ignition switch 115 of the motor vehicle on (with switches 117 and 119 closed), solenoid 113 urges valve body 110 from its normally open position to come in contact with valve seat 112, thus closing off opening 111 and by-pass ports 200 for allowing the flow of cooling fluid to be directly controlled by thermostat 10. As noted, as the engine warms up, the cooling fluid therein will also increase in temperature and thermostat 10 will open, thus allowing the fluid to circulate through to the radiator. If the coolant temperature rises above an acceptable level, such as, due to the failure of the thermostat 10 to open whereby the fluid is not able to circulate, or for any other reason, then the increased temperature of the cooling fluid will be detected by thermoswitch 117 which will interrupt the circuit to solenoid 113, thus allowing spring 114 and spring 116 to urge valve 110 to occupy its normally open position. Therefore, with opening 111 and ports 200 open, the cooling fluid will circulate through the by-pass valve 100 to the radiator. In the event of an electrical system failure at solenoid 113, spring 114 and spring 116 similarly will urge valve body 110 to an open position even though the thermostat 10 may be open.

The various scenarios described above and the appropriate response in accordance with the present system are depicted below in Table I:

TABLE I

|  | NORMAL OPERATION | THERMOSTAT FAILURE | ELECTRIC FAILURE TO BY-PASS VALVE |
|---|---|---|---|
| Thermostat | Open | Closed | Open |
| By-Pass Valve | Electrically closed when ignition started | Opened by interruption of circuit | Open |
| Fluid Flow | Through Thermostat | Through By-Pass Valve | Through Both Thermostat and By-Pass Valve |

As will be readily appreciated in accordance with the present invention, in any situation fluid in the engine block of the motor vehicle will not be prevented from flowing to the radiator and, as such, the engine will not overheat. In the event that the by-pass valve of the present system does not operate properly (e.g., due to electrical failure the valve remains in its normally open position), only a slight inconvenience will be thrust upon the automobile operator, i.e., the operator will have to wait for a longer period of time for the engine to warm to a sufficient operating temperature, since the fluid will circulate through the by-pass irrespective of the temperature of the engine block. However, the delay inconvenience is sufficiently minor when compared to the damage that can be caused by an engine that overheats.

I claim:

1. In a device for controlling the flow of cooling fluid between a fluid-cooled engine and a radiator, wherein a primary passage is provided with a thermostat that normally controls the flow of cooling fluid between the engine and the radiator, the improvement comprising:
   a bypass passage connected in parallel with said primary passage and thermostat;
   a control valve contained within said bypass passage, said valve comprising a solenoid operated cup-shaped valve body and means for continually urging open said valve toward an open position; and
   means for de-energizing the solenoid for positioning said control valve in an open condition when either the engine is not operating or the cooling fluid temperature exceeds a predetermined level, and for energizing the solenoid for positioning said control valve in a closed condition when the engine is operating and the cooling fluid temperature is below said predetermined level.

2. The device of claim 1 wherein said means for continually urging said control valve toward an open position is a spring means.

3. The device of claim 1 wherein said solenoid is operatively connected to a thermoswitch, said thermoswitch responsive to the cooling fluid temperature for electrically disconnecting said thermoswitch when the cooling fluid temperature exceeds said predetermined level.

4. The device of claim 3 wherein switch means are wired in series with said solenoid and thermoswitch for selectively disconnecting said solenoid to open said control valve.

5. The device of claim 4 wherein said switch means is a manually-operated switching means.

6. The device of claim 5 wherein said switch means is operated by the engine ignition switch.

7. In a device for controlling coolant fluid flow between a fluid cooled engine and a radiator, comprising, a casing through which all said coolant fluid flows, a primary passage in said casing having a thermostat for normally controlling coolant fluid flow through the primary passage and casing, a by-pass passage in said casing in parallel with said primary passage, a cup-shaped control valve including means for maintain said control valve in a normally open position for coolant fluid flow through said control valve and by-pass passage, solenoid means for causing closing of said control valve to in turn close said by-pass passage, said solenoid means surrounding said casing, an electrical circuit for activating said solenoid means for closing said control valve, and a thermoswitch in said electrical circuit for disconnecting said solenoid means from the electrical circuit for causing opening of said control valve when the temperature of the cooling fluid exceeds a predetermined level.

* * * * *